March 16, 1965  J. V. JOHNSTON  3,173,215
APERIODIC NORTH-SEEKING GYRO
Filed May 22, 1962
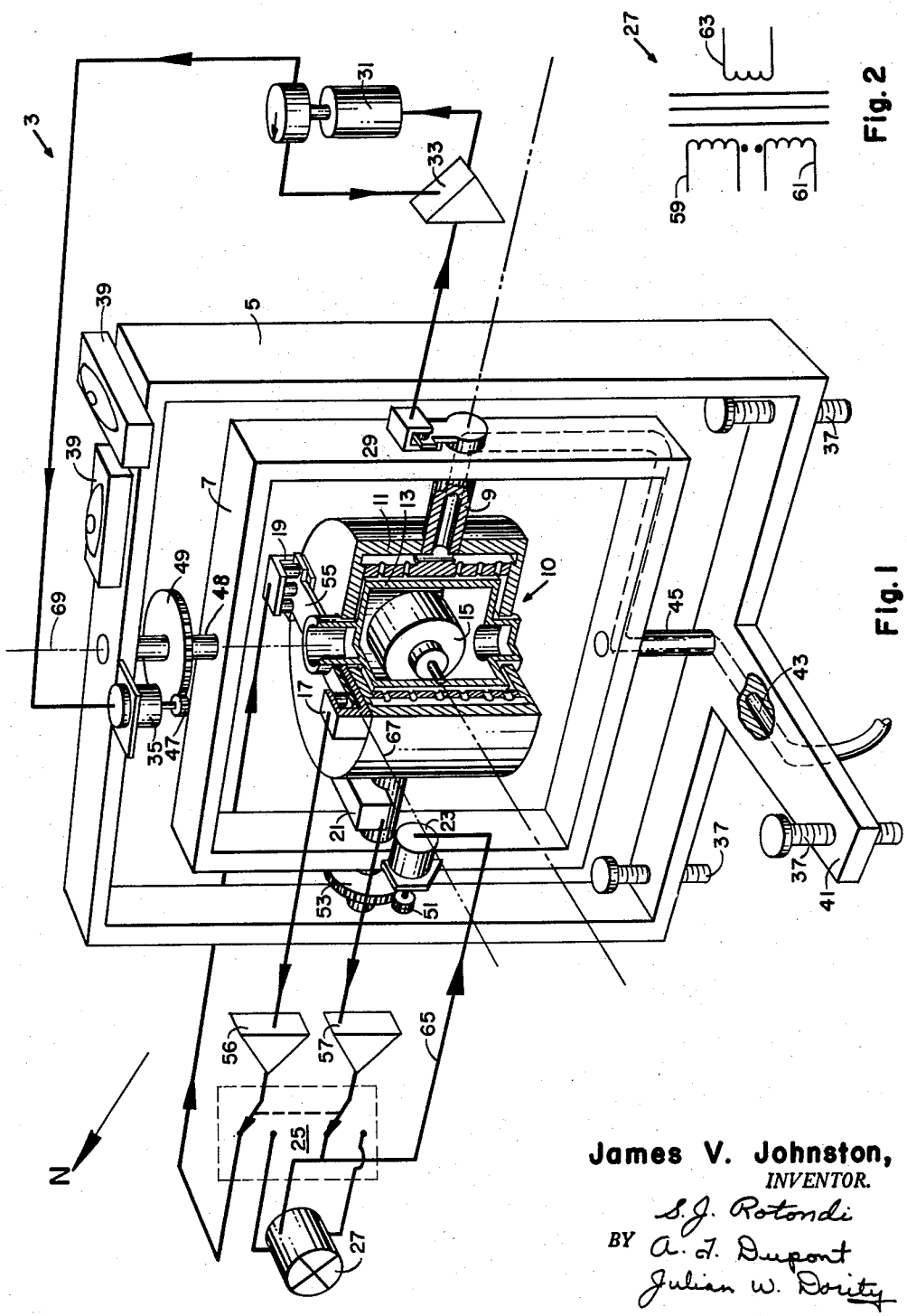
James V. Johnston,
INVENTOR.

United States Patent Office 3,173,215
Patented Mar. 16, 1965

3,173,215
APERIODIC NORTH-SEEKING GYRO
James V. Johnston, 821 Giles Drive, Huntsville, Ala.
Filed May 22, 1962, Ser. No. 197,561
6 Claims. (Cl. 33—226)
(Granted under Title 35, U.S. Code (1952), sec. 266)

The invention described herein may be manufactured and used by or for the Government of the United States for governmental purposes without payment of any royalties thereon.

This invention relates to gyros and more particularly to an aperiodic north-seeking gyro.

The name for the aperiodic north-seeking gyro is derived from the fact that the period of oscillation of the rotor of the gyro about the north-south axis is independent of the gyro's mechanical parameters and/or its suspension. Furthermore each cycle of oscillation about the north-south axis is independent of the previous cycles and the time for one complete cycle of oscillation may vary from one cycle to the next.

Gyros, such as the pendulous north-seeking gyro, have a fixed period of oscillation about the north-south axis which is sometimes referred to as the mechanical resonant frequency of oscillation. The pendulous type north-seeking gyros swing on a wire or are suspended in oil and have the adverse effect of being affected by translational motion and seismic shocks. Translational motion and seismic shocks may change the period of oscillation of the pendulous type gyro thereby causing the gyro to give false output signals.

The aperiodic air-bearing north-seeking gyro which is my invention operates in a similar manner as the pendulous north-seeking gyro and utilizes all optimum features of the pendulous system without any of the inherent deficiencies, such as suspension and current transfer. The aperiodic north-seeking gyro oscillates about the north-south axis; however, the gyro's casing and the rotor do not swing on a wire nor are they suspended in oil as is the case in the pendulous system. Furthermore, by coupling together the output of a gyro pickup, which senses horizontal angular displacements of the rotor axis of the gyro, and the output of an air-bearing pendulum, which senses deviations of the rotor axis from the horizontal plane, and feeding the combined signal to a servo motor which drives the horizontal gimbal, the time in which the rotor takes to precess to the north-south axis is shortened considerably.

In view of these facts, an object of this invention is to provide a gyro which is torqued at rates up to twice that of the torques which it senses.

Another object of the invention is to provide a gyro in which the time required for the gyro to swing from one side of north to the other is independent of the mechanical parameters of the gyro.

A further object of the invention is to provide a gyro in which the time for the gyro to swing from one side of north to the other decreases as the gyro approaches north.

The foregoing and other objects of this invention will become more fully apparent from the following detailed description of the embodiment of the invention and from the accompanying drawings, in which:

FIGURE 1 is a diagrammatic view of the gyro and its electrical controls.

FIGURE 2 is a schematic showing of the mixing circuit for combining signals from the gyro.

In the drawings, wherein for the purpose of illustration, there is shown a preferred embodiment of the invention, the numeral 3 designates an aperiodic air-bearing north-seeking gyroscope system comprising: a vertical mounting frame 5; a vertical axis azimuth gimbal 7 rotatably disposed in the vertical mounting frame for rotation about a first axis; a horizontal shaft 9 rotatably disposed in said vertical axis azimuth gimbal for rotation about a second axis which is perpendicular to said first axis; a gyro 10 having a housing 11 attached to the horizontal shaft, a hermetically sealed cylinder 13 disposed within the housing for rotation about a third axis which is perpendicular to the second axis, and a rotor 15 disposed within cylinder 13 for rotation about a fourth axis which is perpendicular to the third axis; pickup means 17 mounted on housing 11 for generating an electrical signal responsive to angular displacement of the cylinder within the housing; a torquing means 19 mounted on housing 11 for aligning the cylinder to the null position within the housing when the torquing means is energized by pickup 17; a level sensing device 21 attached to the horizontal shaft for generating an electrical signal responsive to angular deviations from the horizontal plane; a first electromotive device 23 for rotating horizontal shaft 9 and housing 11 about the second axis; switching means 25 connected to the output of pickup means 17 and the output of level sensing means 21 for completing a circuit between the output of the pickup means and torquing means 19 and for connecting the output of level sensing device 21 to electromotive device 23 when the switching means is in a first position, and for connecting the output of the pickup and the output of the level sensing device to a mixing circuit 27 when the switching means is in a second position; a horizontal shaft pickup 29 disposed to sense the displacement of the horizontal shaft about the second axis; and a motor-driven integrating tachometer-potentiometer 31 connected to the output of the horizontal shaft pickup via gain amplifier 33 for controlling the gain amplifier so that electromotive device 35 will slow down as the horizontal shaft approaches a level position.

The vertical mounting frame is mounted on a platform and leveled by means of leveling screws 37 and spirit levels 39. Outer leg 41 of the mounting frame has a passageway 43 therein which allows air from an external supply, not shown, to flow through to shaft 45, vertical axis azimuth gimbal 7, horizontal shaft 9 and into the gyro's housing 11 to support the hermetically sealed cylinder 13.

To rotate the vertical axis gimbal 7 about axis 69 when electromotive device 35 is energized, the electromotive device has a shaft which carries at its outwardly extending end a geared wheel 47 disposed in mesh relationship with geared wheel 49 which is secured to rotatable shaft 48. The electromotive device 23 which is mounted on vertical axis gimbal 7 operates in the same manner as electromotive device 35 and is provided to rotate horizontal shaft 9 by means of the meshed gears 51 and 53.

In order to allow gyro 10 to rotate in any direction, it is mounted on the horizontal shaft of the gimbal system and is dynamically balanced about all axes so that it would not be affected by translational motion and seismic shocks. The gyro is a standard air-bearing gyroscope such as the ones disclosed in Patents 2,925,736 and 2,926,530 and its rotor may be energized in any conventional manner that will allow the rotor to have a swing of at least ±90 degrees about the north-south axis.

For the purpose of determining the angular deviation of the inner cylinder 13 of the gyro with respect to the outer housing 11, an inductive pickup 17 is mounted on the gyro's housing and a copper plate 55 is attached to the inner cylinder. Any deviation of the copper plate from the null position causes the pickup 17 to generate an electrical signal. When switching means 25 is in the first position, this signal may be utilized to energize torquer 19 so as to return the inner cylinder to the null position. Both the torquer and the pickup are standard items and their operation and construction are fully described in Patent 2,926,530.

A standard air-bearing pendulum 21 such as the one disclosed in Patent 2,958,137 is mounted on the horizontal shaft and generates a signal responsive to deviations of the gyro from the horizontal plane. The outputs of pickup 17 and the level sensing device 21 are amplified by amplifiers 56 and 57 respectively and fed to the switching circuit 25. When the switching circuit is in the first position as shown in FIGURE 1, the output of pickup 17 is connected to the torquer 19 via amplifier 56, and the output of level indicating device 21 is connected to electromotive device 23 via amplifier 57.

By changing the position of switch 25 the gyro system is placed in the gyro compassing position. When the gyro system is in the gyro compassing position, the output of pickup 17 and level sensing device 21 are connected to the mixing circuit 27 via amplifiers 56 and 57.

In order to compare the two output signals, a mixing circuit comprising a transformer having a pair of oppositely wound primary windings is utilized (FIGURE 2). The output of the pickup is connected to primary winding 59 and the output of the level sensing device is connected to primary winding 61. When there is a voltage on the primary windings an output signal is induced on output winding 63 and its magnitude and polarity depends on the magnitude and polarity of the two signals supplied to the primary winding. For the purpose of energizing electromotive device 23, output winding 63 of the mixing circuit is connected to the electromotive device 23 and the direction in which the electromotive device rotates depends on the polarity of the signal supplied by the output winding 63.

The principle of operation of this system is quite different from any other north-seeking gyro. The unit has a self erecting mode, that is, after the assembly is set up and leveled, the mode switch 25 is switched to a first position shown in FIGURE 1. Gyro pickup 17 drives through amplifier 56 to energize torquer 19. The energization of torquer 19 causes cylinder 13 to rotate to the poistion wheer the spin axis of the rotor aligns with the null axis 67 of the gyro. The output signal from level sensing device 21 is fed through amplifier 57 to energize electromotive device 23 and the energization of electromotive device 23 causes the electromotive device to rotate horizontal shaft 9 so that the spin axis of the rotor aligns with the horizontal plane. When this function has been accomplished, the mode switch 25 is then switched to a second position hereafter referred to as the gyro compassing position. The nulling circuit which comprises torquer 19 is removed from the gyro pickup circuit and inner cylinder 13 is now free to rotate. The gyro senses the horizontal component of the earth's rate of rotation and begins to precess to the axis of rotation of the earth which is in the vertical plane of the north-south axis. This precession causes a displacement of the inner cylinder and the spin axis of the rotor from the null axis and also causes pickup 17 to generate a voltage signal responsive to the deviation from the null axis. A short time after the gyro begins to precess to the north-south axis, the gyro's housing begins to turn or tilt on the horizontal shaft causing level sensing device 21 to generate a voltage signal responsive to the deviation of the level sensing means from the horizontal plane. This voltage signal is amplified and fed into a mixing circuit to be combined with the amplifier voltage signal from pickup 17. These two signals oppose each other and the output from the mixer has a polarity which is opposite the output of the level sensing means. The combined signal from the mixer is fed to electromotive device 23 for driving it and the electromotive device rotates the horizontal axis shaft in such a direction that it produces a torque which is in the same direction as the torque sensed by the gyro from the earth's rate of rotation. These two torques, the earth's rate and the torque produced by the shaft displacement, add together to produce a faster precession of the rotor about the gyro output axis 69. The greatest amount of torque which can be produced is exactly twice that of earth's rate in the horizontal plane. This effectively produces a system that is twice as fast as any standard pendulous system.

As the horizontal shaft is displaced, pickup 29 senses this displacement and sends a voltage signal through amplifier 33 to integrating tachometer-potentiometer. The integrating tachometer-potentiometer, which is a standard item and old in the art, sends a feedback signal back to amplifier 33 closing an integrating loop of the azimuth axis servo system. This feedback signal controls the gain amplifier so that electromotive device 35, which is also connected to the output of the integrating tachometer-potentiometer, will slow down as the horizontal shaft approaches a level position. The portion of the output signal of the integrating tachometer-potentiometer that goes to electromotive device 35 rotates the azimuth gimbal 7 in the same direction as the precessional direction of the gyro about the output axis. This rotation of the azimuth gimbal will reduce some of the displacement between the spin axis of the gyro and the null position on its outer case. As the gyro's spin axis rotates into the north-south plane the torque produced by the earth's rotation which the gyro senses will also reduce. When the gyro spin axis passes through the north-south plane the torque produced by the earth's rotation will reverse. However, because of the rapid precessional rate which the gyro has been subjected to in moving towards north, the momentum of the mass will continue to swing the gyro beyond north. The vertical azimuth gimbal 7 is still following very slowly the gyro's spin axis. Therefore the earth's rate torque is, in effect, applying a braking force to the precession of the rotor about the output axis. At this time the displacement sensed by the gyro pickup 17 is reduced and consequently the output of the mixing circuit has less component of the gyro pickup. Furthermore at this time the signal produced by the level sensing means is of a polarity to attempt to bring the horizontal gimbal back into the horizontal plane. The output of the mixing network, since it is receiving more signal from the level sensing means than from pickup 17, causes the direction of rotation of electromotive device 23 to reverse. The torque now being supplied to the horizontal axis is in the same direction as the torque being applied to the gyro from the earth's rate of rotation. These two torques combine to provide the braking action for the swinging gyroscope. The precessional motion of the rotor about the output axis of the gyro will stop, reverse direction, and go back towards north.

The displacement in the gyro pickup 17 will be further reduced allowing still further signal from the air-bearing pendulum or level sensing device to drive the gimbal into the horizontal plane. However, the level sensing device cannot drive the gimbal into the horizontal plane until zero signal is received from gyro pickup 17. The portion of the gyro pickup which is attached to the gyro's housing is slewed from its original position towards the north direction by electromotive device 35 and the electromotive device will continue to drive until the horizontal gimbal is in the initial zero position or horizontal position. Consequently the azimuth gimbal is still being positioned towards east from its original direction even as the gyro precessional direction has changed and it is swinging towards north from its first overshoot. The reason azimuth gimbal 7 is positioning towards east is because it is displaced 90 degrees from the null axis, and when the null axis oscillates about the north-south axis, the azimuth gimbal will be in alignment with the east-west axis. This construction, however, is merely a matter of choice and the azimuth gimbal and the null axis could be in alignment.

Again, as the gyro passes through north the earth's rate torque will be reversed. Level sensing means 21 is still attempting to level the horizontal gimbal which is applying a torque in opposition to earth's rate torque which the gyro is now sensing. The momentum of the gyro or rotor swinging about the output axis towards north carries it beyond north, and through null position, which is the position where copper plate 55 is under the coils of the pickup, to a new position on the other side of north. The horizontal gimbal will be level and hence no signal will be transmitted to its amplifier. However, the integrating tachometer-potentiometer will still have a small signal stored on its potentiometer which is still driving the azimuth gimbal in its original direction towards east. The rate of displacement of the gyro pickup is much greater than it was previously and its voltage signal will be amplified and mixed with the output of level sensing device 21 again. The output of the mixing circuit is fed to electromotive device 23 causing a fast reversal of the electromotive device driving the horizontal gimbal out of level in such a direction as to produce a torque on the gyro in the same direction as the earth's rate of rotation which the gyro is sensing. Again these torques add up to provide the braking torque necessary to stop the swing of the rotor about the output axis and reverses its direction of swing. The horizontal gimbal is now going out of level in the same direction as that initiated by the original swing. This in turn provides a further driving signal to drive the azimuth gimbal into the east direction. This procedure will continue on subsequent oscillations until such time as the azimuth gimbal has oriented the gyro pickup into the north direction. At this time the torque applied to the gyro as it swings to either side of its pickup 17 are equal and opposite. Therefore the angle through which the rotor precesses about the output axis will be equal and opposite. The displacement of the horizontal gimbal on each side of north will also be equal, therefore the integrating tachometer-potentiometer will cease driving the azimuth gimbal and the azimuth gimbal is therefore aligned in the true east-west direction.

If it were desired to use the aperiodic air-bearing north-seeking gyro in a moving vehicle, the gyro could be constructed and mechanically balanced around its horizontal axis thereby eliminating unbalanced torques when the instrument is moved while in operation. In this application it would be necessary to mount the horizontal axis on an inertially stabilized platform and utilize the azimuth axis of the platform to position the entire system into the north direction. Under these conditions the gyro can keep an inertially stabilized platform aligned to north while the platform, which is mounted in a vehicle, travels cross country.

It is to be understood that the form of the invention that is herein shown and described is the preferred embodiment, and that various changes in the shape, size and arrangement of parts may be resorted to without departing from the spirit of the invention or the scope of the subjoined claims.

The following invention is claimed:
1. A north-seeking gyroscope comprising:
   (a) a vertical mounting frame;
   (b) a vertical axis azimuth gimbal rotatably disposed in said vertical mounting frame for rotation about a first axis;
   (c) a horizontal shaft rotatably disposed in said vertical axis azimuth gimbal for rotation about a second axis which is perpendicular to said first axis;
   (d) a housing attached to said horizontal shaft;
   (e) a cylinder disposed within said housing for rotation about a third axis which is perpendicular to said second axis;
   (f) a rotor disposed within said cylinder for rotation about a fourth axis which is perpendicular to said third axis;
   (g) pickup means mounted on said cylinder and said housing for generating an electrical signal responsive to angular displacement of said cylinder within said housing;
   (h) a torquing means mounted on said cylinder and said housing for aligning said cylinder to the null position within said housing when the torquing means is energized;
   (i) a level sensing means attached to said horizontal shaft for generating an electrical signal responsive to angular displacement about said second axis;
   (j) a first electromotive means for rotating said horizontal shaft and said housing about said second axis;
   (k) switching means connected to the output of said pickup means and said level sensing means for completing a circuit between the output of said pickup means and said torquing means and for connecting the output of said leveling means to said first electromotive means when said switching means is in a first position, and for connecting the output of said pickup means and the output of said level sensing means to a mixing circuit when said switching means is in a second position;
   (l) means for connecting the output of said mixing circuit to said first electromotive means for rotating said horizontal shaft;
   (m) a horizontal shaft pickup disposed to sense the displacement of said horizontal shaft about said second axis;
   (n) a second electromotive means disposed for rotating said vertical axis azimuth gimbal; and
   (o) means for connecting the output of said horizontal shaft pickup to said second electromotive means for rotating said vertical axis azimuth gimbal.

2. The device as set forth in claim 1 wherein said means for connecting the output circuit of said horizontal shaft pickup to said second electromotive means comprises an integrating tachometer-potentiometer circuit.

3. A north-seeking gyroscope comprising:
   (a) a mounting frame;
   (b) a gimbal disposed in said mounting frame for rotation about a first axis;
   (c) a shaft rotatably disposed in said gimbal for rotation about a second axis which is perpendicular to said first axis;
   (d) a housing attached to said shaft;
   (e) a cylinder rotatably disposed within said housing for rotation about a third axis which is perpendicular to said second axis;
   (f) a rotor rotatably disposed within said cylinder for rotation about a fourth axis which is perpendicular to said third axis;
   (g) pickup means mounted on said cylinder and said housing for generating an electrical signal responsive to angular displacement of said cylinder within said housing;
   (h) a level sensing means attached to said shaft for generating an electrical signal responsive to angular displacement of said shaft about said second axis; and
   (i) a control means connected to the output circuits of said pickup means and said level sensing means for rotating said shaft responsive to the magnitude and polarity of the electrical signals produced by said pickup means and said level sensing means.

4. The device as set forth in claim 3 wherein said control means comprises:
   (a) a first amplifier connected in series with the output of said pickup means;
   (b) a second amplifier connected in series with the output of said level indicating means;
   (c) mixing means connected to the outputs of said first and second amplifiers for combining the outputs of said amplifiers; and
   (d) an electromotive means connected to the output of said mixing means and mounted on said shaft for rotating the shaft responsive to the electrical output of said mixing means.

5. The device as set forth in claim 4 which further comprises:
 (a) a second pickup disposed on said gimbal to sense the displacement of said shaft about said second axis;
 (b) a second electromotive means mounted on said frame for rotating said gimbal about said first axis;
 (c) means for connecting the output of said second pickup to said second electromotive means.

6. The device as set forth in claim 5 wherein said means for connecting the output of said second pickup to said second electromotive means comprises:
 (a) an integrating motor driven tachometer-potentiometer.

References Cited by the Examiner
UNITED STATES PATENTS

| | | | |
|---|---|---|---|
| 2,771,799 | 11/50 | Schaffer et al. | 74—5.34 |
| 2,852,943 | 9/58 | Sedgfield | 74—4.7 |
| 2,926,530 | 3/60 | Mueller et al. | 74—5.47 |

ROBERT B. HULL, *Primary Examiner.*

S. FEINBERG, *Examiner.*